United States Patent [19]
Gould et al.

[11] Patent Number: 4,777,660
[45] Date of Patent: Oct. 11, 1988

[54] RETROREFLECTIVE OPTICAL COMMUNICATION SYSTEM

[75] Inventors: Gordon Gould; William H. Culver, both of Gaithersburg, Md.

[73] Assignee: Optelecom Incorporated, Gaithersburg, Md.

[21] Appl. No.: 109,921

[22] Filed: Apr. 10, 1987

Related U.S. Application Data

[63] Continuation of Ser. No. 668,760, Nov. 6, 1984, abandoned.

[51] Int. Cl.$^4$ .......................... H04B 9/00; H01S 3/00
[52] U.S. Cl. .................................. 455/605; 455/606; 332/7.51; 350/355
[58] Field of Search ............... 455/604, 605, 606, 607; 372/26; 332/7.51; 350/355, 356

[56] References Cited

U.S. PATENT DOCUMENTS

| | | | |
|---|---|---|---|
| 2,995,740 | 8/1961 | Shreckengost | 343/7 |
| 3,241,145 | 3/1966 | Petrides | 343/705 |
| 3,374,044 | 3/1968 | Benson | 350/102 |
| 3,417,398 | 12/1968 | Lewis et al. | 343/18 |
| 3,443,098 | 5/1969 | Lewis | 455/605 |
| 3,517,982 | 6/1970 | Fonda-Bonardi | 350/160 |
| 3,573,463 | 4/1971 | Goodwin et al. | 455/607 |
| 3,766,395 | 10/1973 | Keir | 250/214 R |
| 3,766,498 | 10/1973 | Brewer et al. | 350/356 |
| 3,806,834 | 4/1974 | Johnston et al. | 332/7.51 |
| 3,842,372 | 10/1974 | Pao et al. | 332/7.51 |
| 3,863,064 | 1/1975 | Doyle et al. | 455/605 |
| 3,943,357 | 3/1976 | Culver | 455/605 |
| 4,063,195 | 12/1977 | Abrams et al. | 332/7.51 |
| 4,085,387 | 4/1978 | Asawa et al. | 350/356 |
| 4,096,380 | 6/1978 | Eichweber | 455/605 |

FOREIGN PATENT DOCUMENTS

| | | | |
|---|---|---|---|
| 2500239 | 8/1982 | France | 455/605 |
| 2012293 | 9/1971 | Fed. Rep. of Germany | . |
| 3113154 | 12/1982 | Fed. Rep. of Germany | 455/604 |
| 58-48540 | 3/1983 | Japan | 455/605 |

OTHER PUBLICATIONS

Klein et al–Aperture Stark Modulated Retroflector, J. Appl. Phys., 51(12), Dec. 1980, pp. 6101–6104.

La Tourrette et al–An Efficient Stark Effect Modulator–Proceedings of the Symposium on Optical & Acoustical Micro-Electronics, edited by James Fox––Apr. 16–18, 1974, pp. 535–541.

*Primary Examiner*—Robert L. Griffin
*Assistant Examiner*—Andrew J. Telesz, Jr.
*Attorney, Agent, or Firm*—Kerkam, Stowell, Kondracki & Clarke

[57] ABSTRACT

A retroreflective optical communication system in which a laser at a control station is aimed at a retroreflector at a second position or station whose reflectivity can be varied so as to impress a signal onto the retroreflected beam, and then back to the first station for detection. The communication link is such that the laser and aiming capability are at the receiving or control station and, greatly reducing the aiming and power requirements and cost at the retroreflector end of the link. The retromodulator optical communication system provides a high data rate, secure, non-jammable line-of-sight communication link between the second station, which may be a remotely piloted vehicle (RPV) and its control station. The retromodulator maybe entirely passive and thus would not give its presence away as would RF transmitting and receiving stations.

13 Claims, 5 Drawing Sheets

RETROREFLECTIVE OPTICAL COMMUNICATION SYSTEM

This is a continuation of application Ser. No. 668,760, filed Nov. 6, 1984, now abandoned.

BACKGROUND OF THE INVENTION

The invention relates to a retroreflecting optical communication system which includes apparatus for modulating a laser beam at a point spaced from the source of the beam and to reflect the modulated beam toward the source of the beam to transmit in the direction of the source signals imposed on the beam at the retroreflector.

Related subject matter is disclosed and claimed in U.S. Pat. No. 3,943,357 granted Mar. 9, 1976 entitled Remote Controlled Vehicle Systems, W. H. Culver.

The modulation means of the system utilizes a modification of the principles of Stark effect modulation described in an article entitled "Stark Effects in $C^{13}H_3F$: Passive Q Switching of the $CO_2$ Laser Using $C^{13}$ Enriched Methyl Fluorides, by Eric Weitz and George Flynn in *Journal of Applied Physics* Vol. 42 No. 12 (Nov. 1971) pages 5187–5190, and in earlier publications cited in the article.

SUMMARY OF THE INVENTION

The communication system of the invention makes possible the imposition on a laser beam directed from a first station, (which may have been modulated at the source of the beam to carry information), additional information for return to, or to the vicinity of the beam source at the first station, thus providing means whereby information may be transmitted by a laser beam in two directions between the source of the beam and a remote retroreflector carrying station, which need not itself have means for accurate aiming of a laser beam nor possess a laser beam source.

In order to provide the above desirable features, a high information rate modulator must be used having the following properties:

1. The modulator must operate at a high frequency. For example, to handle a television channel, it must be able to operate at a frequency of at least 4 MHz.

2. The modulator must produce a large depth of modulation on the beam in order to efficiently use carrier beam power. To achieve this in the prior art, Stark modulators have been made long in the beam direction to achieve a large cumulative effect, and thin (1 to 2 mm) so that a large transverse electric field can be employed without voltage breakdown. That is, these prior art modulators have been designed with a high longitudinal aspect ratio of at least 10 to 1. At such aspect ratio the angular field of view through the modulator is then restricted to less than 5°.

3. The modulator must intercept, modulate, and return a sizable fraction of the cross section of the diverging incident beam. For a communication link with a range of 10 kilometers the transverse cross sectional area of the modulator must be 25 $cm^2$ or more. This can be accomplished with the conventional modulators only by stacking many in parallel. An excessive radio frequency power of several hundred watts is then required to drive the modulator.

4. If a large range of angles of incidence is to be accommodated without tracking the incident beam and aiming a longitudinal modulator, the modulator must be in the form of a thin transverse pancake with transverse large area electrodes. Thus a material must be found which can generate a large depth of modulation in a path length smaller by an order of magnitude than those employed in conventional modulators.

5. In order to take advantage of the superior characteristics of a $CO_2$ laser transmitter beam, the modulator must be able to modulate one or more of the several score of possible $CO_2$ oscillation wavelengths in the neighborhood of $\lambda = 10$ $\mu$m. The superior $CO_2$ beam characteristics are high power (greater than 1 watt, CW), high efficiency (up to 15%), low attenuation in haze, and low wavefront distortion by the atmosphere.

6. Properties 1, 3, 4 and 5 also require that the transverse pancake electrodes be transparent to a $\lambda = 10$ $\mu$m beam (attenuation less than a few percent), and at the same time conduct a high frequency electric current to impress an electric field across the modulating medium (resistivity less than 10 $\Omega$-cm). These requirements have generally been considered incompatible, since free conduction electrons in metals and semiconductors also absorb long wavelength infrared radiation.

7. In order to maximize its field-of-view, a modulator combined with a retroreflector should comprise a window-electrode and cube-corner, both of a material with a high index of refraction, in addition to transparency and electrical conductivity.

In view of the above considerations, it would appear improbable that a combination of materials exists which would make feasible a practical high frequency transverse pancake modulator. Thus those electro optic and Stark modulators described in the literature, which can modulate a $CO_2$ laser beam, modulate a beam which passes between and parallel to the electrodes rather than through and at an angle to the electrodes.

The present invention includes a unique combination of materials with which a pancake modulator with the hereinbefore listed properties can be designed and fabricated: A rare isotopic species of methyl fluoride, $C^{13}H_3F$, can produce a 60% depth of modulation by the Stark effect at one of the $CO_2$ laser wavelengths in 1 cm of beam path length; Germanium, having a particular concentration of a dopant as described in a paper by Evan D. Capron and Orville L. Brill in "Absorption Coefficient as a Function of Resistance for Optical Germanium at 10.6 $\mu$m" in Applied Optics, Vol. 12, (March 1973) on pages 569–572, with a minimum absorption coefficient of 1% per centimeter for a $CO_2$ laser beam, though normally considered to be an insulating dielectric at room temperature, has just enough conductivity through a 1 cm thick slab to power a 5 cm diameter Stark modulator at a frequency up to about 100 MHz. Germanium also exhibits the very high index of refraction of 4. No other materials known in the art come close to the desired properties of either of these materials.

As is known, the Stark effect is the change of wavelenth of a line in optical spectrum of an atom or molecule caused by the application of an electric field to the atom or molecule. If a sufficiently strong electric field is applied to an atom or molecular gas many of the absorption lines are observed to shift in wavelength or break up into several components which shift different distances and directions in wavelength.

If a cell containing such a gas is placed in front of a retroreflector such as a cube-corner retroreflector, and an electric field is applied to the gas, the intensity of the light traversing the cell and being retroreflected by the retroreflector will be altered or modulated as a function of the applied voltage.

Thus, when an electric field is applied to the gas, the absorption coefficient of this gas will be altered for a monochromatic light beam, such as a laser beam, whose wavelength is in the region of the absorption line. The application of the electric field may either reduce or increase the absorption depending as to whether the light wavelength was on the original line center or alternatively off the line center in a region into which the absorption is moved by the application of the electric field.

Important features of a good absorbing material are that it has an appropriate absorption line at or near the wavelength of a practical laser source, that this be a strong absorption line, that the material has a large Stark effect wavelength shift for a low electric field, and that the material has a relatively high electrical breakdown voltage. Numerous laser-material combinations have been noted in the literature as set forth hereinbefore. A particularly useful combination for this application is $C^{13}H_3F$ used in conjunction with the P'(32) line of the (00°1–02°0) transitions of the $CO_2$ laser at 9.6 micrometers wavelength.

One branch of the rotational components of the fundamental 3 parallel stretching vibrational transitions of $C^{13}H_3F$ have extraordinarily high absorption coefficients. Only one of these rotation-vibration spectral absorption lines (the $QR(4)$ transition of $C^{13}H_3F$) overlaps a $CO_2$ laser transition (the P'(32) transition at $\lambda=9.658$ m). The absorption coefficient of the $QR(4)$ line is equal to 0.3 cm$^{-1}$ per torr pressure. This absorption coefficient is over 100 times larger than those of other $C^{13}H_3F$ transitions or of the 20 or so other molecules which have been demonstrated to Stark modulate a $CO_2$ laser beam. Because of the material abundance of the $C^{13}H_3F$ molecules is about 1% of the $C^{12}H_3F$, it had not been recognized that isotopically enriched $C^{13}H_3F$ gas combined with transparent, but conducting, Ge window-electrodes would make feasible a high performance pancake modulator with only 1 cm of pathlength through the gas.

An important feature of a retroreflective modulator is the diameter of its optical aperture: The amount of light that is retroreflected to an optical receiver back at the laser source is proportional to the fourth power of the retroreflective modulator diameter. Thus, any configuration that will allow a large aperture is important to increased sensitivity when used in a communucation system.

The amount of light reflected by a cube-corner retroreflector decreases as the angle between the axis of symmetry of the cube-corner and the light beam increases and for a hollow cube-corner reflector the amount of light decreases to zero at 35° from the symmetry axis. If the cube-corner is filled with a material of high refractive index, the solid angle in which the cube-corner will retroreflect light increases. Thus, a solid germanium cube-corner reflector, having a refractive index 4 at 9.6 micrometers, will have a larger solid angle over which it will be useful, than a hollow cube-corner of the same dimensions.

In some configurations it is desirable to use the germanium windows as electrodes for applying the electrical field for the Stark effect.

BRIEF DESCRIPTION OF THE DRAWING

The principles of the invention will be more fully set forth with reference to the accompanying drawings which diagrammatically illustrate representative forms of the invention.

DETAILED DESCRIPTION OF THE INVENTION

Figure 1:
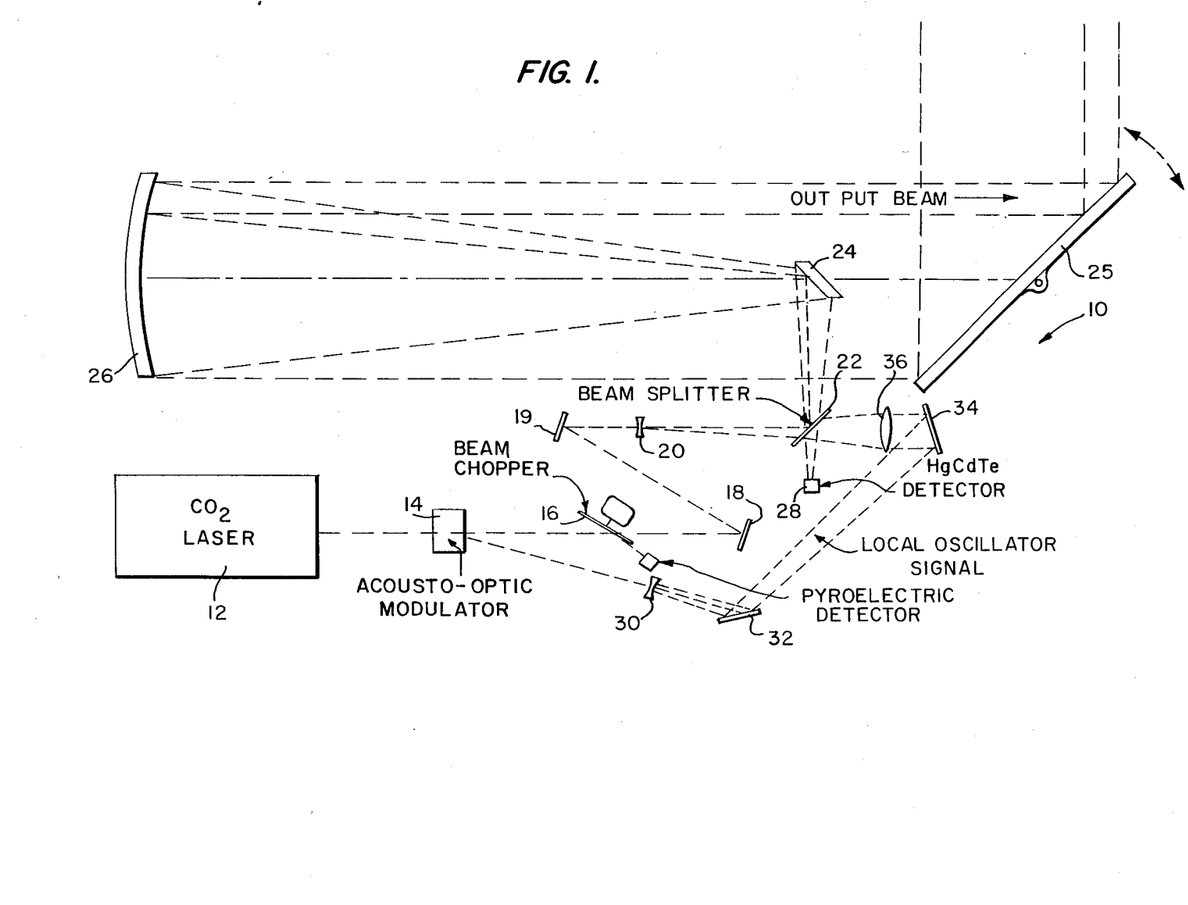
FIG. 1 shows a schematic layout of a transmitter receiver unit.

Referring to FIG. 1, 10 generally designates a transceiver unit comprising a $CO_2$ laser 12, an acousto-optic modulator 14, a beam chopper 16, mirrors 18 and 19, lens 20, a beam splitter 22, a telescope diagonal 24, a parabolic mirror 26 and a detector 28. The system may also include, where optical hetrodyning is desired, a lens 30, mirrors 32 and 34 and a lens 36 which directs the beam to beam splitter 22. The system may also include a rotatable mirror 25 for aiming the system at a remote station.

Figure 2:
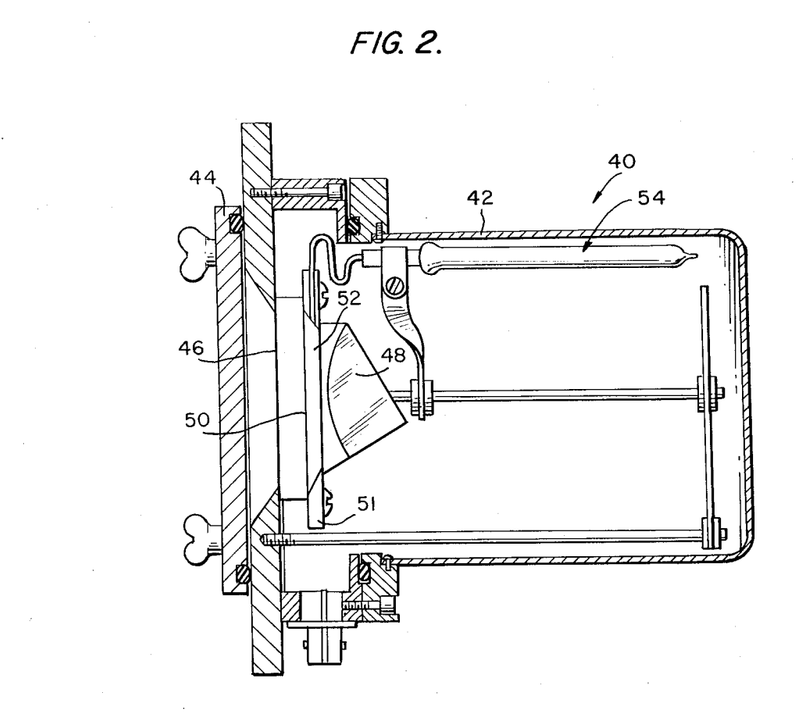
FIG. 2 is a partial sectional view of a retroreflecting modulator of the invention.
Figure 3:
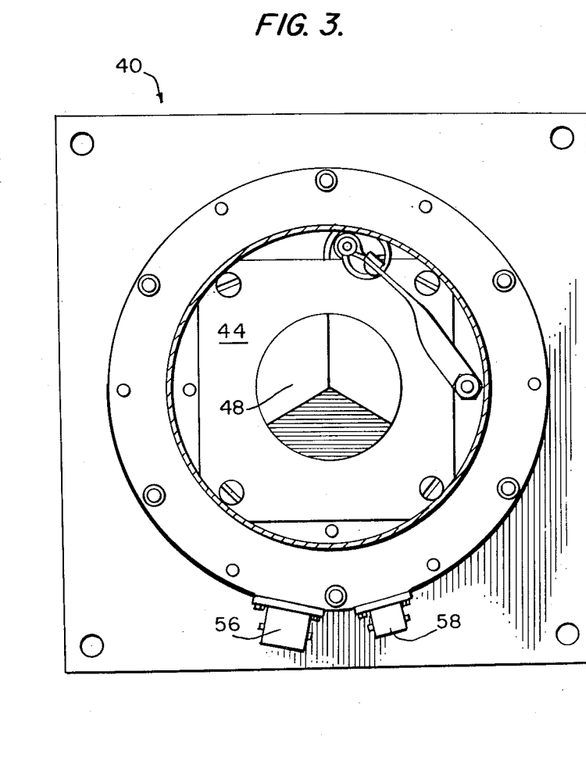
FIG. 3 is a front view of the structures shown in FIG. 2.

The various elements referenced above will be described in greater detail hereinafter. Referring to FIGS. 2 and 3, there is illustrated a Stark retromodulator generally designated 40 and generally comprising a housing 42 having an o-ring sealed face plate 44 at the front end, a germanium window 46, a solid germanium cube-corner retroreflector 48 mounted in space relationship directly (i.e., there is a straight line path with no intervening components between at least a portion of the window and a portion of the cube corner) from the back side 50 of the germanium window to provide a space 52 to be filled with $C^{13}H_3F$ gas. Rearwardly of the cube-corner retroreflector 48 is space for mounting the driving electronics for the modulator and power supply for the germanium cube-corner retroreflector and the germanium window 46. Also illustrated generally at 54 are means for charging the $C^{13}H_3F$ gas in the sealed space between the germanium window and the germanium cube-corner retroreflector 48. In FIG. 3, connectors for power and for the input of a video signal are shown at 56 and 58.

The retromodulator 40 comprises a Stark effect modulator, the solid germanium cube-corner retroreflector 48 operates on the $CO_2$ laser beam from laser 12. The solid germanium retroreflector has a refractive index of 4 at the $CO_2$ laser wavelength so that the radiation incident upon the entrance face 46 is bent toward the optic axis of the retroreflector (see FIG. 4), giving a very much larger solid angle of response than could be obtained from a hollow cube-corner. If a smaller response solid angle is sufficient a hollow cube-corner can be substituted.

Figure 4:
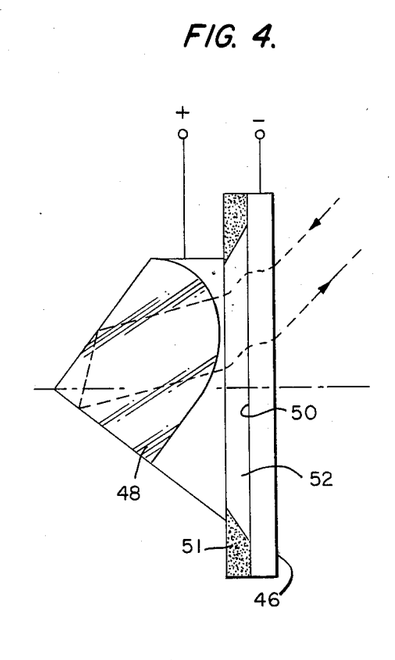
FIG. 4 is a schematic view of a solid cube retroreflector; and a front germanium window therefore.

Modulation is accomplished by changing the absorption by $C^{13}H_3F$ gas of the $CO_2$ laser beam generated by the P'(32)(00°1-02°0) vibration-rotation transition at 9.66 micrometers. There is a near coincidence of an absorption line of the $C^{13}H_3F$ and the laser line with the laser line lying about 90 MHz above the center of the absorption line. Application of an electric field of several hundred volts per centimeter to the $C^{13}H_3F$ gas splits the absorption line into nine components, some of which overlap and increasingly absorb the $CO_2$ laser beam. The characteristics of this modulator are discussed in greater detail hereinafter.

The conventional electro-optic crystal modulator has a high frequency capability. However, it is long and thin and therefore restricts both the cross-sectional area and field of view of the retroreflector. On the other hand, the Stark effect retromodulator disclosed herein has an upper frequency limit in excess of 50 MHz, responds over a 100° field of view, and can be practically fabricated up to 10 inches or more in diameter. A comparison of two different modulators is shown in the following table:

| - | OPTELECOM Retromodulator | Cube-corner with Conventional Modulator |
|---|---|---|
| Bandwidth | 50 MHz | 500 MHz |
| Response Solid Angle | >2 Ster. | $10^{-3}$ Ster. |
| Frontal Area | 20 cm$^2$ | 1 cm$^2$ |
| Modulation Index | 40% | 60% |

The range of this system at low altitudes is of course strongly effected by propagation through the atmosphere. Both beam attenuation and scintillation caused by turbulence will limit its performance. The "visibility distance" at the $CO_2$ laser wavelength, $\lambda=9.66$ μm, is about 10 times that at a visible wavelength. Thus, an airborne retromodulator can communicate with a ground station most of the time that its companion TV can see the ground. At medium altitudes, operation will often be inhibited by clouds. At high altitudes, above the clouds, where atmospheric propagation is usually not restricted by aerosol scatter or water vapor, ranges greater than 200 km should be attainable.

The retromodulator communication system could provide a jamproof, secure, and cheap video link for an expendable attack RPV. In this application, the vehicle would proceed along a clear line of sight until it reaches the target area. At this time it could jettison the retroreflector, leaving it behind in a parachute or balloon, and proceed to dive on the target, paying out an optical fiber over which video communication is maintaine1 between the missile and the retromodulator which now acts as a relay. The characteristics of the retromodulator communication link would also be useful for transmitting TV pictures from other mobile platforms such as missiles. For many applications, such remotely piloted vehicles can outperform manned systems for a fraction of the cost and without exposing personnel to enemy fire. Other suitable vehicles would include reconnaissance vehicles, cruise missiles, high flying RPV's, and secure submarine/sonobouy-to-aircraft communication links.

The range from which a video signal can be received with adequate signal to noise ratio is a most important quantity. It is determined, of course, by the system parameters but also importantly by atmospheric factors such as absorption, scattering and wave front distortion introduced by atmospheric turbulence. Despite a large and growing literature on atmospheric effects, it is not possible to predict precisely how often the system range will exceed any given value either as a function of location on the earth or in terms of the usually monitored atmospheric quantities such as visibility and cloud height.

There are two modes of signal detection commonly used, direct detection and optical heterodyne detection. In the latter case a "local oscillator" beam interacts with the incoming signal beam at the detector to increase the average sensitivity. The received signal power occasionally drops to zero due to total phase cancellation between the two interacting wave fronts, causing greater signal fluctuations than are observed for direct detection.

In FIG. 1, elements 14, 30, 32, 34 and 36 provide for optical heterodyne detection.

Absorption at 9.657 m

Absorption at the wavelength of operation of the present retromodulator communication link, $\lambda=9.65742$ m or wave number of 1035.5 cm$^{-1}$, is due mainly to water vapor and $CO_2$ in the atmosphere. The Air Force standard atmosphere gives an attenuation of 0.051 km$^{-1}$ ($-0.22$ db/km) due to absorption. Calculations by others give the following absorption coefficient for 10.6 m radiation:

| Air Temperature | Relative Humidity | Absorption Coefficient |
|---|---|---|
| 40° F. | 40% | 0.16 db/km |
| 86° F. | 80% | 1.7 db/km |
| 86° F. | 10% | 0.19 db/km |

Scattering at 10 μm

The Air Force standard atmosphere gives scattering attenuation in the vicinity of 10 μm of $4.5\times10^{-3}$km$^{-1}$, (0.02 db/km) for clear weather and $2.2\times10^{-2}$km$^{-1}$, (0.08 db/km), for hazy weather. Others have performed communication experiments over a 30 km path have provide the data in Table I. The attenuation includes both scattering and absorption for the 10 μm radiation.

TABLE I

Propagation characteristics of 10.6 μm radiation over a 30 km path.

| Weather Conditions | Clear | Haze | Light Fog | Fog | Light Rain (0.01 in/hr) |
|---|---|---|---|---|---|
| Visibility (km) | 100.00 | 30.00 | 2.0 | 0.5 | 20.00 |
| Visible attenuation coeff (db/km) | 0.17 | 0.57 | 8.5 | 34.0 | 0.85 |
| 10.6μ attenuation coeff (db/km) | 0.54 | 0.66 | 0.9 | 1.9 | 1.60 |
| Temperature (°F.) | 66 | 58 | 60 | 58 | 50 |
| Humidity (%) | 20 | 40 | 40 | 75 | 100 |
| 30 km path attenuation (db) | 16 | 20 | 20 | 56 | 50 |

The maximum ratio of attenuation due to scattering in the visible to that at 10 μm is about 50 and occurs for particle size distribution peaked about 1 μm in size. The attenuation due to scattering attenuation from rain droplets and snow is about equal for the two wavelengths. A cloud with boundaries easily discernible in the visible usually has particle sizes large enough so that it will be opaque, even if somewhat less so, to 10 μm radiation.

Interference by Clouds

For the usual layered atmosphere the clouds bottoms even if broken usually occur at nearly constant altitude, rarely varying more than a few percent over distances of tens of kilometers. Thus there is a well defined "ceiling" below which an RPV must fly to be able to observe the ground. Likewise there will be few clouds protruding below this ceiling to interfer with obtaining a cloud-free path from an RPV flying under the clouds to a station near the earth.

Atmospheric Turbulence

Atmospheric scintillation and short term beam wander due to turbulence will cause further degradation of the TV signal. Beam wander, the displacement of the center of the beam, is due to gross refractive effects that cause the beam to wander about randomly, typically over a few tenth of a milliradian. The frequency spectrum of the wander of a land path for visible light has a peak at a few Hz and dies off rapidly above 10 Hz. Beam wander can be compensated for by tracking which will be further discussed in reference to FIGS. 1 and 6.

An example of the retromodulator shown in FIGS. 2, 3 and 4 the device has the following dimensions:
(a) The window diameter 46 was 7 cm and the cube-corner 48 diameter was 5 cm.
(b) The spacing between the germanium window and the face of the cube-corner was ¼ inch. These dimensions result in a modulator capacity of 2.5 picofarads As shown in FIG. 4, the cube corner 48 and window 46 serve as the only electrodes for impressing an electric field across the cell filled with gas 52.

Germanium for the 1 cm thick window 46 and cube-corner 48 had a resistivity specification of 5Ω-cm This resistivity corresponds to a minimum in the 10 m absorption coefficient. This minimum absorption coefficient is equal to 0.01 cm$^{-1}$.

The germanium surfaces were anti-reflection coated for an angle of incidence of 40° from the normal. This combination of specifications results in an insertion loss of less than 15%. The transmission of the double window pancake modulator was actually 93% at normal incidence and exceeded 75% out to an angle of incidence of 60°. The germanium window 46 and cube-corner 48 were sealed to a glass spacer 51 with a hard epoxy resin of the type used to seal windows to commercial laser tubs. After the modulator was filled with $C^{13}H_3F$ and sealed off, the modulator operated for a substantial term without any deterioration in the depth of modulation. Thus, the $C^{13}H_3F$ has not soaked up in the epoxy, nor has there been any substantial evolution of contaminating gas through the seal. Also, there has apparently been no substitution of $C^{12}$ for $C^{13}$ in the methyl fluoride.

A negligible amount of power is required to polarize the molecules by the Stark effect The only power required is that to charge and discharge the capacity of the modulator with a bandwidth of 4.5 MHz. This power, less than 2 watts with a 400 volt peak-to-peak RF modulating voltage, was found to be satisfactory.

Characterization of the Retromodulator

The following sets of measurements were made on a prototype retromodulator and are discussed below:
(a) The transmission of the retromodulator vs. DC electric field
(b) Depth of modulation vs. laser frequency
(c) Depth of modulation vs. $C^{13}H_3F$ pressure
(d) Depth of modulation vs. modulation frequency
(e) The returned modulation signal vs. angle of incidence for both polarizations of incident beam.

Basic Setup

Measurements of the operating characteristics of the retromodulator were performed using a transceiver, comprising a GTE Model 950 $CO_2$ laser 12, an SAT HgCdTe detector 28, mounted in a Honeywell liquid nitrogen cooled Dewar, and the related optics for transmitting and receiving the laser beam. The detector proved to have a quantum efficiency only 2.5% of the rated value. The GTE $CO_2$ laser 12 has a Bausch & Lomb blazed grating reflector at one end of the resonator for selecting the $P^1(32)$ line of the $CO_2$ for oscillation, the only line which shows Stark modulation by $C^{13}H_3F$ gas. The other end of the resonator is terminated by a mirror, mounted on a piezo-electric PZT stack for tuning the laser. A sinusoidal voltage was applied to the PZT stack during measurements, thus sweeping the laser across the $P^1(32)$ line over a 40 MHz frequency range. The sweep was approximately centered on the laser line. The HgCdTe IR detector 28 was used in a photo voltaic mode with a 0.4 volt DC reverse bias applied.

The signal from this detector was amplified by a broad band pre-amplifier (50 KHz to 500 MHz), not shown, having a voltage gain of 16. The detector bias was applied at the amplifier input where a low frequency output was obtained. The depth of modulation of the Stark modulator as a function of the laser frequency was obtained from a dual beam oscilloscope which displayed the high and low frequency signals versus the PZT voltage illustrated in FIG. 7 hereof.

Because the Stark shift effect is voltage polarity independent, a bias voltage must be applied to the modulator. Without a bias, the effective modulation frequency would be at the second harmonic of the drive frequency. The bias voltage should be greater than half the peak-to-peak drive voltage.

Figures 8, 9A:
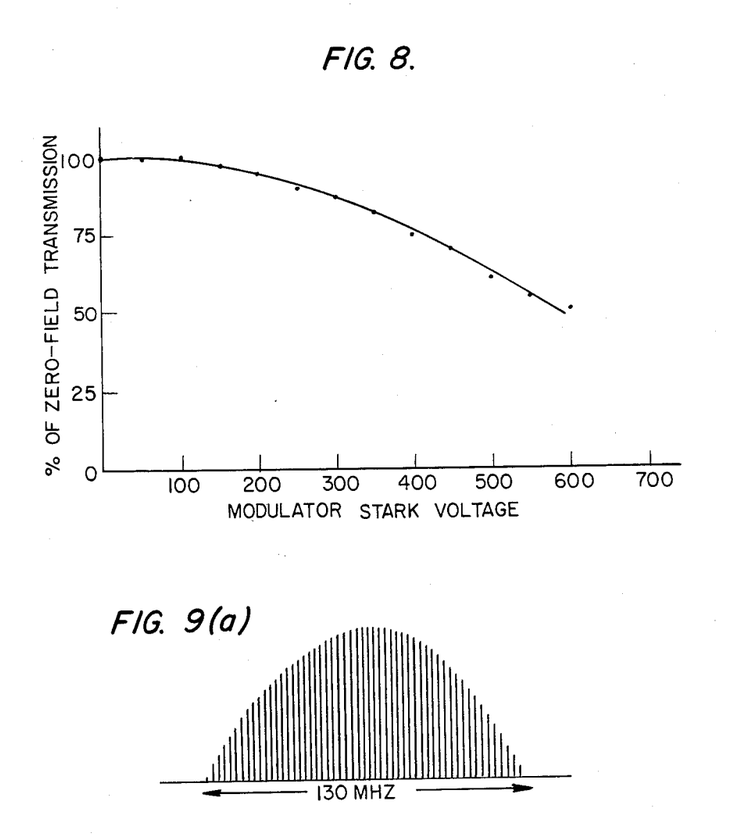
FIG. 8 is a chart showing modulator Stark voltage.
FIG. 9(a) illustrates output of frequency swept pulse laser.

The measurement of the DC Stark effect, in 50 volt steps, is shown in FIG. 8, and shows that, as the voltage is increased, the absorption increases. This implies that the $CO_2$ laser line is off on the side of the methyl fluoride absorption line. As the voltage is increased, the methyl fluoride line is broadened with some components shifted towards the $CO_2$ line, thus increasing the absorption. The applied electric field was limited by the breakdown voltage (700 volts) to about 1100 volts/cm.

Using the voltage-vs-transmission curve, the bias and AC drive voltages were chosen to give maximum modulation. The optimum point also had to be chosen such that the total voltage, peak AC plus bias, was under the breakdown voltage. From these results, the optimum voltages were determined to be:
AC=400 volts peak-to-peak, and
bias=450 volts DC This selection of operating voltages also selects an operating range with minimal distortion from a linear modulation. Nevertheless, the distortion is sufficient to require that an FM modulated subcarrier be used in order to minimize distortion of the video signal. Residual distortion of the video picture by this effect was not discernible in operation.

The depth of modulation as a function of a laser frequency and gas pressure differ surprisingly from expectation.

Figure 9B:
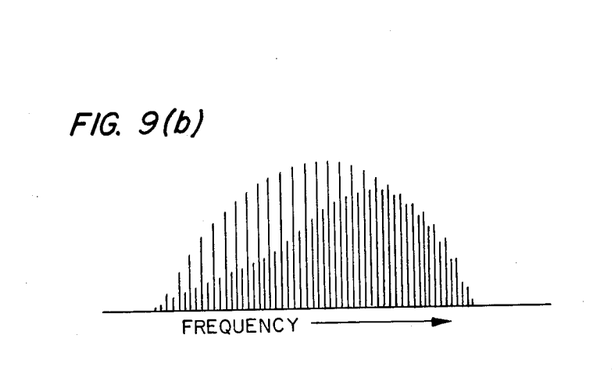
FIG. 9(b) illustrates the output of a test cell double value function representing transmitted radiation on two sweeps with zero and 300 volts applied respectively.

Using a high pressure flowing gas capillary $CO_2$ laser provides a pressure broadened $CO_2$ laser having a frequency tuning range of about 130 MHz. The unbroadened full doppler linewidth at half power of the $P^1(32)$ line is 66 MHz. The extended frequency range of the capillary laser made it possible to tune through the entire methyl fluoride absorption line. Shown in FIGS. 9a and 9b is the power transmitted through an empty test cell as the laser is swept over its tunable range. Also shown is the power transmitted through the test cell filled with $C^{13}H_3F$ with 0 and with 300 volts applied. It is to be noted that the center of the $CO_2P^1(32)$ line center was observed to be approximately 23 MHz above the center frequency of the $Q_{R(4),K=3}$ absorption line of $C^{13}H_3F$. On the basis of this and other data, it was expected that the maximum depth of modulation would be achieved at the center of the methyl fluoride line. The measured depth of modulation at this frequency at the optimum pressure of 2 Torr of $C^{13}H_3F$ and with an electrode spacing of 5/16 inch, was a disappointing 6%. The depth of modulation was calculated with the following defining equation:

$$m(\% \text{ output}) = \frac{100\%(S)}{2RG}$$

where

S is the peak-to-peak detected signal power at the modulation frequency,

R is the unmodulated detected signal, and

G is the voltage gain of the detector amplifier.

A more useful quantity is the modulation index as a percent of the input power incident on the modulator.

It was noted that at the center of the $C^{13}H_3F$ line, the application of an electric field spreads the methyl fluoride line and increases the transmission through the test cell. The modulation index may thus be called negative. On the other hand, at the extreme high frequency end of the tuning range the spreading of the methyl fluoride line by application of an electric field results in a decreased transmission and thus the modulation index in this frequency region may be termed positive.

Figure 7:
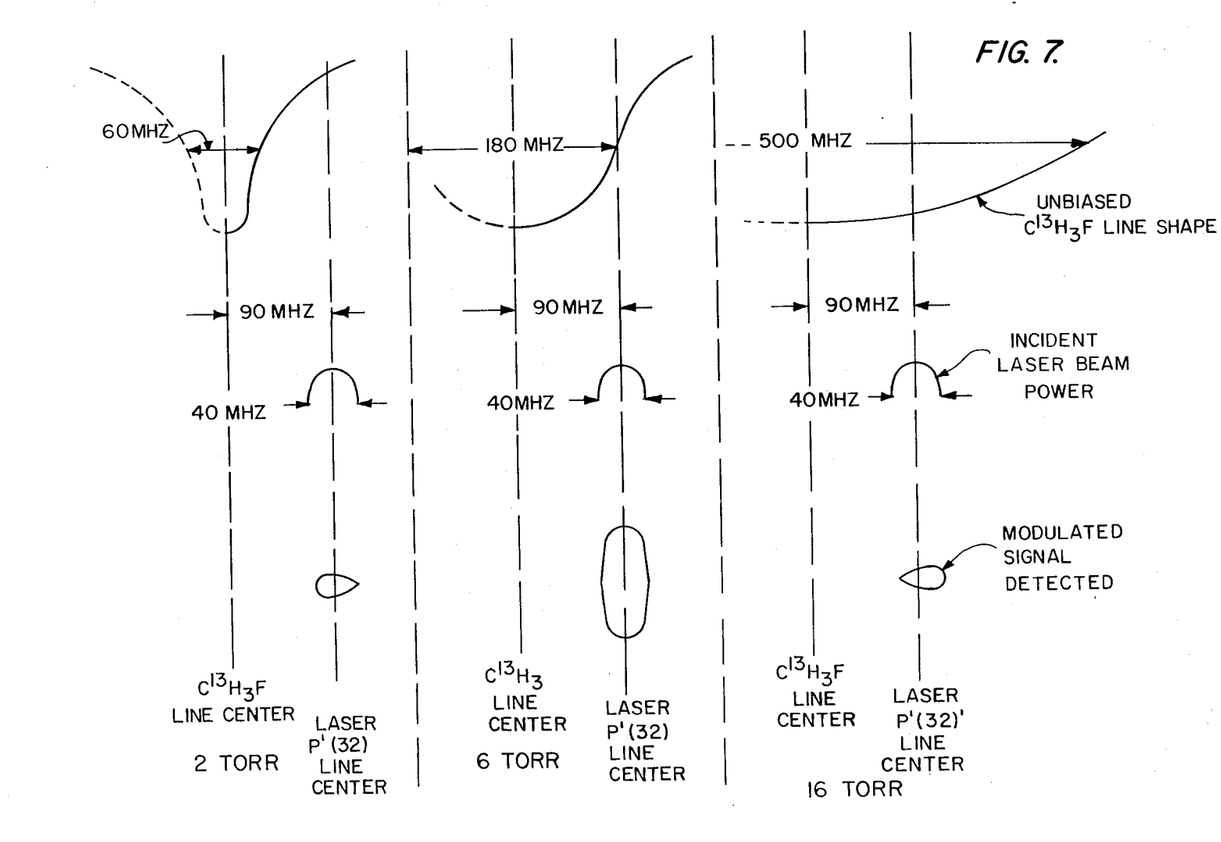
FIG. 7 is a chart showing modulation amplitude as function of scanned laser frequency at three different $C^{13}H_3F$ pressures.

Using the GTE Model 950 laser built into the transmitter/receiver in the laboratory, the tuning range of the laser was limited to about 40 MHz. The observed modulation signal as the laser was tuned through its 40 MHz range is illustrated in FIG. 7. The surprising result was that the peak depth of modulation was 40% of the transmitted beam at the higher optimum pressure of 6 Torr. Also, the modulation index was positive over the entire turning range. The inescapable conclusion is that the line center of the $P^1(32)$ line of the two test lasers was shifted to about 90 MHz above the line center of the $C^{13}H_3F$ absorption line.

The explanation of this frequency shift is not a shift due to a change of pressure from approximately 50 Torr average in the capillary laser to approximately 6 Torr in the test laser. The apparent explanation is as follows: The gas flow through the capillary laser was at a high velocity, estimated to be near the speed of sound in the mixture. The GTE laser was sealed and since the laser was coupled out of the capillary laser resonator only at one end, the power in the oppositely travelling beams within the resonator was unequal. Thus a doppler shift in the oscillation frequency can account for the 70 MHz frequency shift of the apparent center of the $CO_2$ line. There is also the fortuitous advantage of using the GTE laser that the percentage change in the absorption coefficient is greater on the edge of the methyl fluoride line than at its center, even though the absolute value of the absorption coefficient is not as great there. Thus at a higher optimum pressure a seven-fold increase in the depth of modulation was achieved. It was also observed, fortuitously, that the depth of modulation is more nearly uniform across the tuning range of the lasers at 6 Torr pressure than at either lower or higher pressure.

The retromodulator was driven at a frequency of 20 MHz, with an AC voltage of 400 1 volts peak-to-peak, and a bias of 450 volts DC. For this fixed drive, the change in modulation was measured as the pressure was varied between 1 and 16 Torr. The optimum pressure was found to be about 6 Torr.

The fall-off of modulation as a function of pressure, past 6 Torr, was proportional to $1/P^2$, where P is the pressure.

Using these results, 6 Torr was chosen as the optimum operating pressure for quarter-inch spacing of the electrodes.

At 6 Torr, the rate at which absorbed power is dissipated by collisions in the gas should be increased by a factor of 3, and therefore the maximum intensity which can be handled by the modulator without loss of modulation index, should be raised to about 0.3 watts/cm$^2$. If it is desired to modulate a still higher beam intensity, the optimum pressure can probably be pushed to a higher value than 6 Torr by using a smaller spacing between the electrodes.

The passive optical train is shown schematically in FIG. 1. The 5 mm laser beam after passing through the acousto-optic modulator 14 and beam chopper 16 is displaced toward the telescope 26 by two mirrors 18 and 19, then diverged by a plano-concave lens 20, reflected by a beam splitter 22 to the telescope diagonal 24 and thence to the telescope mirror 26 which collimates the outgoing beam. The retroreflected signal beam is focused by the telescope mirror to the diagonal mirror 24 and reflected through the beam splitter 22 to the detector 28. If heterodyne detection is used, the local oscillator signal is obtained by deflecting a small portion of the power in the beam with an acousto-optic modulator 14. This deflected beam, which is frequency shifted from the laser frequency by the frequency of the acoustic wave is diverged and refocused on to the beam splitter 22 which it is coherently joined to the incoming signal beam before reaching the detector 28. All mirrors were gold coated. All transmitting elements were of cadmium telluride except for the irtran window in front of the detector.

In the system, the beam diverging lens has a focal length of −11 cm. The 5 mm laser beam is thus enlarged to 6 mm at the beam splitter 22 and 6.4 cm(2.1/2″) at the telescope mirror. (Actually on the far side of the telescope mirror rather than the near side, as indicated in FIG. 1). The collimated outgoing beam has a diffraction limited far field divergence angle of $10^{-4}$ radians. Any smaller divergence angle will be enlarged to $10^{-4}$ rad. by wavefront distortion in the inhomogeneous atmosphere at extreme range. This may be enlarged to 1 mrad by moving the lens 2.5 cm toward the beam splitter. To facilitate this variation in beam divergence the lens may be mounted on a short length of calibrated optical bench.

The usual beam splitter, as used in an interferometer, has a reflectance and transmittance of 50% which results in a 75% power loss by the time the return beam reaches the detector. In this system the beam splitter can be designed to greatly reduce this loss, and also to avoid overloading the detector. If the retromodulator is in the near field of the transmitted beam (Fresnel diffraction zone), the return beam will have about the same diameter—6.4 cm—as the outgoing beam and will be focused within a 12 mm diameter concentric spot at the beam splitter.

Since the aperture diameter of the retromodulator is 5 cm, a sizeable fraction of the 6 watt output of the laser would be returned to the detector. The detector is saturated by a power greater than 3 milliwatts and destroyed by a power greater than 100 milliwatts. To preclude this, a portion of the beam splitter 22 was coated with a gold spot 22', FIG. 5, large enough to block the return beam but thin enough to allow a 0.1% transmission to the detector. This same gold spot would then efficiently reflect the outgoing beam with a 99% reflectance.

If the retromodulator is in the far field of the transmitted beam (Fraunhofer diffraction zone), the return beam is enlarged. At the fuzzy boundary between the two zones, the Fresnel number, $$N = \frac{d^2}{4\lambda R} \approx 1.$$

This crossover region is at $R \approx 100$ meters. At extreme range the return beam fills the 25 cm(10") dia. telescope aperture, is focused in an F5.6 cone to a 2" diameter at the diagonal and to a 2.5 cm(1") dia. at the beam splitter. In this case most of the return beam passes around the gold spot and is efficiently transmitted to the detector as desired.

If optical heterodyne detection is used, only about 1 milliwatt is needed in the local oscillator beam. The local oscillator beam is focused down in an F5.6 cone to a 2.5 cm(1") dia. at the beam splitter 22 by a pair of back-to-back plano-convex lenses 36. Therefore, one side of the beam splitter may be antireflection coated. If the other side is left uncoated about 10% of the local oscillator beam will be reflected into the detector, while 90% of the return signal beam will be transmitted through the area not covered by the gold spot. The back side of the gold spotwwas painted black with a 10 $\mu$m wavelength transparency of about 10%. Thus, the local oscillator beam and the return signal beam have the same moon shape and their diffraction patterns can be spatially coherent at the detector.

Figure 5:
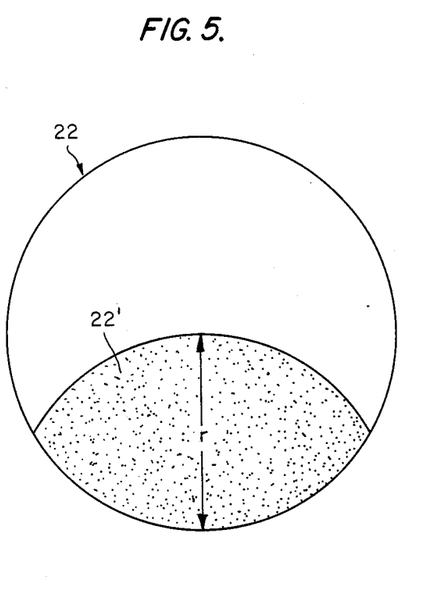
FIG. 5 is a perspective view of the beam splitter with a gold spot protective means for the detector shown in FIG. 1.

In the test model, the beam splitter 22 had a diameter of 2.5 cm and the gold spot 22' was formed such a 2.5 cm circle for the gold spot had its radius r, FIG. 5, centered on the circumference of the beam splitter.

Tracking the Retromodulator

The philosophy of the retromodulator communication link is to make the remote unit on the vehicle as simple and inexpensive as possible, while performing the more expensive functions at the ground station. In keeping with this the retromodulator is to be tracked by the ground station. The tracking capabilities required are of two types: angular tracking through space to keep the beam on target, and frequency tracking to counter the Doppler shift. These requirements will be discussed separately below.

Angular Tracking

Two different regimes of angular tracking are possible:

(a) The vehicle motion requires angular mirror motion having relatively high velocity, low acceleration and low frequency response.

(b) The refractive beam wander requires low velocity, high acceleration and high frequency response.

Since tracking the vehicle requires sweeps through large angles, a pair of flat mirrors must reflect the full diameter of the incoming signal beam. For the system described herein, these mirrors must be 40 cm in diameter. Trackers capable of following the vehicle are available and require only a suitable error signal from the receiver. However, existing trackers are not able to respond with the high accelerations and short time constants which may be required to counter the refractive beam wander.

Fortunately, the maximum angular excursion of the wandering beam is 0.2 to 0.3 mrad. Thus, these high frequency micromotions can be corrected by tipping the much smaller beam splitter 22 in front of the detector for direct detection systems or by tipping the diagonal mirror 34 for heterodyne detection.

Figure 6:
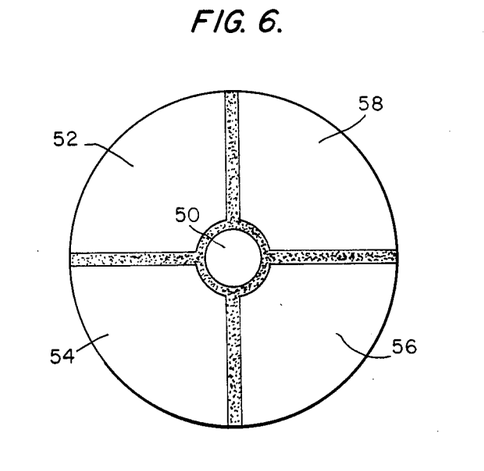
FIG. 6 is a diagrammatic top plan view of a configuration for a tracker for the communication link.

For both tracking regimes discussed above, the simplest and most reliable means for generating an error signal is a quadrant detector. A high performance configuration for such a detector is shown in FIG. 6. In order to minimize detector noise, the video signal is detected on the small central spot 50. As the beam drifts off, a two-dimensional error signal is developed from the current difference between semicircular pairs 52–58. By a masking technique, such a configuration may be fabricated on a single HgCdTe chip.

We claim:

1. A retroreflective optical communication system comprising a control station, and a remote station, said control station including a $CO_2$ laser, and means for aiming the laser at the remote station, said remote station including a solid cube corner retroreflector transparent at 10 micrometers wavelength and means at the retroreflector for varying the reflectivity thereof to impress a signal on to a reflected $CO_2$ laser beam, said means for varying including a window transparent at 10 micrometers wavelength, means sealingly mounting the window in spaced relationship directly in front of the front face of the cube corner, methyl fluoride gas in the space between the window and the front face of the cube corner to thereby define a flat pancake shaped Stark effect cell, and means for impressing an electric field across the cell, by application of voltage to the cube corner and to the window, both the cube corner and the window serving as electrodes for impressing an electrical field across the methyl fluoride gas.

2. The communication system, as defined in claim 1, wherein the solid cube corner comprises germanium.

3. The communication system as defined in claim 2 wherein the laser is tuned to the $P^1(32)$ line of the (00°1–02°0) transition of $CO_2$ at 9.6 micrometers wavelength, and wherein the methyl fluoride gas is $C^{13}H_3F$.

4. The communication system as defined in claim 3 wherein the $C^{13}H_3F$ gas pressure is from about 3 to about 10 Torr.

5. The communication system as defined in claim 3 wherein the $CO_2$ laser frequency is tuned off to one side of the overlapping $C^{13}H_3F$ absorption line by a spacing of between 70 and 110 MHz.

6. The communication system as defined in claim 1 wherein the cube corner and the window serve as the only electrodes for impressing an electric field across the cell.

7. A retroreflective optical communication system comprising a control station, and a remote station, said control station including a $CO_2$ laser, and means for aiming the laser at the remote station, said remote station including a solid cube corner retroreflector transparent at 10 micrometers wavelength and means at the retroreflector for varying the reflectivity thereof to impress a signal on to the reflected $CO_2$ laser beam, said means for varying including a window transparent at 10 micrometers wavelength, means sealingly mounting at the window in spaced relationship in front of the front face of the cube corner, methyl fluoride gas in the space between the window and the front face of the cube corner to thereby define a flat pancake shaped Stark effect cell, the methyl fluoride gas touching said front face and means for impressing an electric field across the cell, and further including means for modulating the output beam of the $CO_2$ laser and wherein the means for aiming the laser beam at the remote station includes optical means for directing the laser beam through a telescope to a rotatable mirror and then to the remote station, said optical means including a beam splitter, and wherein the solid cube corner comprises germanium.

8. The communication system as defined in claim 7 further including a signal detector mounted in one of the optical paths of the beam splitter for detecting the retroreflected laser beam.

9. The communication system as defined in claim 8 further including means for reducing the intensity of the retroreflected laser beam at the beam splitter.

10. The communication system as defined in claim 9 wherein said beam intensity reducing means comprises a partially reflective gold coating on a portion of the beam splitter.

11. The communication system as defined in claim 10 wherein the $C^{13}H_3F$ gas pressure is from about 3 to about 10 Torr.

12. The communication system as defined in claim 7 wherein the cube corner and the window serve as the only electrodes for impressing an electric field across the cell.

13. The communication system as defined in claim 9 wherein said beam intensity reducing means comprises a partially reflective coating on a portion of the beam splitter.

* * * * *